Patented Apr. 28, 1953

2,636,862

UNITED STATES PATENT OFFICE 2,636,862

LUBRICANT AND HYDRAULIC FLUID COMPOSITIONS

Forrest J. Watson, Berkeley, Calif., assignor to Shell Development Company, San Francisco, Calif., a corporation of Delaware No Drawing. Application June 9, 1950, Serial No. 167,262

20 Claims. (Cl. 252—78)

1

This invention relates to lubricating compositions and hydraulic fluids which are especially suitable for use in hydraulic mechanisms. More particularly, this invention pertains to compositions containing one or more organic phosphorus containing compounds, e. g., organic phosphates, phosphonates, phosphinates, etc., and a combination of additives which produce stable, non-corrosive compositions, such as improved fluids especially suitable for use as lubricants and in hydraulic mechanisms, particularly aircraft hydraulic apparatus.

Hydraulic fluids are specialty compositions and must meet many rigorous requirements. For example, it is important that hydraulic fluids do not corrode the metal surfaces with which they come in contact. It is also important that hydraulic fluids are not subject to and resist deterioration due to oxidation. The ability of a hydraulic fluid to resist oxidation is closely related to its corrosivity to metal surfaces since, in general, the oxidation products are extremely corrosive to metal surfaces. Because of the highly machined metal surfaces and close tolerances found in hydraulic mechanisms, any tendency of hydraulic fluids to destroy the same, as by the combined action of oxidation and corrosion, is highly objectionable and should be obviated.

Other desirable properties for hydraulic fluids, particularly for use in aircraft hydraulic mechanisms, are fluidity over a wide range of temperatures, at least as low as about —40° F. to about —60° F., low volatility at a temperature at least as high as 200° F. or higher and non-flammability.

Hydrocarbon oils, such as mineral lubricating oils and the like, synthetic lubricants, such as alkyl esters of organic acids and polymerized alkylene oxides, and compositions containing the same have been employed as hydraulic fluids. However, these compositions are substantially flammable and their use as hydraulic fluid in aircraft is undesirable.

Alkyl, aryl and alkaryl esters of phosphoric

2 acid are substantially non-flammable and possess many other properties which make their use in hydraulic fluid compositions for aircraft desirable. Organic phosphates, such as the above esters, like most phosphorus containing organic compounds, are, however, corrosive and/or susceptible to oxidation and therefore there is at least some reluctance to the use of these materials in aircraft hydraulic systems.

It is, therefore, an object of this invention to provide stable, non-corrosive compositions, especially liquid compositions suitable for use as lubricants and in hydraulic mechanisms, particularly in aircraft hydraulic mechanisms. It is another object of the present invention to provide improved stable, non-corrosive compositions containing or comprising an organic phosphorus-containing compound. These and other objects will become apparent from the description of the invention set forth hereinbelow.

Now, in accordance with the present invention, it has been found that the above and other objects may be attained by a composition comprising a base lubricant and minor amounts of two particular types of additives, the combination of which exerts an unexpected and synergistic effect upon the base lubricant resulting in a composition of outstanding stability and non-corrosivity. More specifically, it has been found that phosphorus-containing compositions, especially organic phosphate-containing compositions, which contain minor amounts of an epoxy compound and an organic sulfur-containing compound, preferably a non-oxygen-containing organic sulfur compound, are substantially non-corrosive and oxidation stable.

The organic phosphorus-containing compositions which are so effectively stabilized by the combination of additives of the invention include compositions which contain or comprise the following organic phosphorus-containing compounds in major or minor amounts: the trialkyl phosphates, especially the trialkyl phosphates wherein each of the alkyl groups contain from 4 to 9 carbon atoms such as tributyl phosphate, dibutyl octyl phosphate, triamyl phosphate, tri-2-ethylbutyl phosphate, tri-n-hexyl phosphate, tri-2-ethylhexyl phosphate, tri-n-octyl phosphate, tris(3,5,5-trimethylhexyl) phosphate, tri-n-nonyl phosphate, and their higher molecular weight homologs; the triaryl phosphates, such as the tricresyl phosphates, diphenyl cresyl phosphate; halogen substituted triaryl phosphates, such as diphenyl o-chlorophenyl phosphate; mixed alkyl aryl phosphates, such as diphenyl octyl phosphate, diphenyl ethyl phosphate; and the trialkaryl phosphates which may also be considered to be triaryl phosphates such as the trixylyl phosphates and the tripseudocumyl phosphates. Other phosphorus-containing compositions to which the invention is applicable include compositions which comprise or contain a trialkyl phosphite, such as tributyl phosphite; an aliphatic phosphonate, such as an alkyl alkenyl phosphonate, e. g., dioctyl isooctene phosphonate; an alkyl phosphonate such as di-n-butyl n-octane phosphate; a mixed alkyl aryl phosphonate, for example an alkyl aromatic phosphonate such as dioctyl styrene phosphonate; an aliphatic phosphate, such as tri-2-chloroethyl phosphate, the phosphate of 3-hydroxy-propyl amyl sulfide; tributoxyethyl phosphate and tri-butoxyoctyl phosphate; an alkyl alkane phosphonate, especially the dialkyl alkane phosphonate, such as dibutyl n-octane phosphonate and dimethyl tetradecane phosphonate; a trialicyclic phosphate such as tris(trimethyl cyclohexyl carbinyl) phosphate; an alkyl alkane aromatic phosphinate such as butyl benzene-butane phosphinate; an alkyl dialkane phosphinate such as butyl dibutane phosphinate; an alkyl aromatic aliphatic phosphinate such as butyl benzene methoxymethane phosphinate; the organic phosphine oxides, such as the trialkyl phosphine oxides and the triaryl phosphine oxides; the various phosphono compounds, such as the bis-(dialkyl phosphono) alkanes, e. g., bis(di-n-butyl phosphono) 1,6-hexane and bis(di-n-butyl phosphono) 1,4 butane; the various tris (dialkyl phosphono) alkyl phosphates, e. g., tris β(di-n-butyl phosphono) ethyl phosphate. In general the phosphorus-containing compounds which are effectively stabilized by the combination of additives of the invention include those compounds containing all and only the following atoms, namely carbon, hydrogen, oxygen and phosphorus atoms.

The phosphorus-containing compositions may contain one or more of the above compounds and classes of compounds. Thus, mixtures of trialkyl phosphates and/or triaryl phosphates may be present. Furthermore, a single phosphorus-containing compound, such as the trialkyl phosphates and triaryl phosphates may contain the same or similar substituent groups (alkyl, aryl, alkaryl) in all three positions or may possess a mixture of various substituent groups.

The combination of additives comprising the present invention is especially effective in reducing the corrosivity and oxidation susceptibility of compositions containing an organic phosphate, a trialkyl phosphate, and/or a triaryl phosphate, and/or a mixed alkyl aryl phosphate or mixtures of the same as well as the corresponding phosphonates and phosphinates.

The combination of additives of the subject invention has also been found to be an effective corrosion and oxidation inhibitor in many types of lubricating compositions and hydraulic fluids, such as synthetic lubricating oil compositions and mixtures thereof. The combinations of additives are however especially effective in lubricating and/or hydraulic fluid compositions which contain a phosphorus-containing compound, especially compositions containing an organic phosphorus-containing compound as the predominating and major component, i. e., those compositions where the proportion of phosphorus-containing component(s) is greater than 50% by weight of the total composition. However, effective results are also obtained by the subject combination of additives wherein the proportion of organic phosphorus-containing compound(s) is less than 50% of the total composition but greater than the proportion of any other specific compound therein.

In practice the proportion of organic phosphorus-containing compound(s) present in compositions of the invention may be between 50% and 90% to 95% by weight of the total composition, although usually the proportion is between 65% and 85% by weight of the total composition.

One of the additives of the present invention is an organic compound which contains an epoxy group, i. e., an organic compound containing an oxygen atom which is linked with two different carbon atoms already connected in some other way. Preferred groups of epoxy compounds suitable for the purposes of the invention include: aryl epoxy compounds such as pinene oxide and styrene oxide, glycidyl ethers, particularly glycidyl ethers containing one carbocyclic group directly attached to the ether oxygen atom, such as glycidyl phenyl ether. Specific epoxy compounds among the glycidyl ethers which are applicable in compositions of the invention include glycidyl cyclohexyl ether and glycidyl o-cresyl ether. Other epoxy compounds among the glycidyl ethers which may be employed include the alkyl glycidyl ethers, such as glycidyl methyl ether, glycidyl ethyl ether, glycidyl isopropyl ether and their higher molecular weight homologs. Epoxy compounds of the type represented by the olefinic oxides, such as isobutylene oxide, ethylene oxide, propylene oxide, isoprene oxide, decene oxide and butadiene monoxide are also suitable. Other suitable epoxy compounds include the aliphatic epoxides, such as epichlorohydrin, glycide, chloroprene oxide as well as the alicyclic epoxides, such as cyclohexylene oxide and cyclopentene oxide.

The epoxy compound which is one of the two components of the combination of additives of the invention may be present in compositions of the invention, such as in compositions containing an organic phosphorus-containing compound, in an amount between about 0.25% to about 5% by weight of the total composition. Particularly effective results are obtained in said compositions wherein the epoxy compound, such as a glycidyl aryl ether or a glycidyl alkyl ether or an aryl epoxide is present between about 1% to about 2% by weight of the total composition.

The other ingredient of the combination of additives employed in the subject invention is an organic, preferably oil-soluble, sulfur-containing compound, such as an organic sulfide and/or an organic disulfide. Preferred groups of organic sulfides suitable for the purposes of the invention include the following hydrocarbyl sulfides; the aliphatic disulfides, especially the high molecular weight alkyl disulfides containing from at least about 8 carbon atoms to about 20 carbon atoms in the alkyl group present therein, such as dioctyl disulfide, dinonyl disulfide, dilauryl disulfide, distearyl disulfide and diheptadecyl disulfide; the aryl disulfides, such as dibenzyl disulfide, diphenyl disulfide, dixylyl disulfide and dinaphthyl disulfide. Other preferred organic sulfides include mixed disulfides, such as the alkylaryl disulfides, sulfurized olefins, sulfurized terpenes as obtained by the reaction of a terpene, such as pinene, with phosphorus pentasulfide, paraffin wax disulfide, such as obtained by the Blanksma reaction by treating chlorinated paraffin wax with sodium disulfide and sulfurized animal oils, such as sulfurized sperm oil.

The organic sulfide most preferred in the combination of additives of the invention is a wax disulfide, which may be obtained as a reaction product of sodium disulfide and a chlorinated paraffin wax, and may be prepared in the following manner: Approximately 5.5 parts by weight sodium disulfide is dissolved in about 2.2 parts by weight of water; the solution is heated and about .7 part by weight sulfur dissolved therein with stirring. The resulting solution together with about 5.2 parts by weight of a chlorinated paraffin wax (chlorine content approximately 30% by weight) and about 10 parts by weight each of denatured alcohol and naphtha were charged into an autoclave and stirred therein at a temperature of about 145–150° C. for 10 hours. The maximum pressure developed was about 220–230 p. s. i. After cooling, about 10 parts by weight water was added and thoroughly admixed. Two layers separated upon standing, a naphtha layer and an aqueous layer. The naphtha layer was separated, dried over anhydrous sodium sulfate, filtered and the naphtha distilled off under reduced pressure, the maximum kettle temperature being not greater than 140° C. There was obtained 21.6 parts by weight of product (wax disulfide) as a viscous, oil-soluble, dark-colored liquid.

A typical analysis of a wax disulfide employed in the compositions of the invention is set forth below:

Specific gravity 20° C./4° C_____ 1.024
Molecular weight_____ 1050
Sulfur_____per cent by weight__ 20–23
Chlorine _____do____ 1.5

Among the sulfurized olefins found to be especially useful are, for example, sulfurized paraffin wax (as may be produced by chlorination of paraffin wax having an average molecular weight between about 225 and 975, dehydrochlorination of the chlorinated product to produce wax olefins and sulfurization of the latter); sulfurized olefin or diolefin polymers boiling above about 400° C., such as are obtained as by-products in the refining of cracked distillates with clay or other refining agents, or in the polymerization of normally gaseous olefins to produce gasoline or the like (e. g., sulfurized methyl pentadiene polymer). Sulfurized esters of unsaturated fatty acids with monohydric alcohols, as methyl, ethyl, propyl, etc.; sulfurized sperm oil; sulfurized jojoba oil, are also useful sulfur-containing compounds which may be employed in the compositions of the invention.

The other component of the combination of additives of the invention, i. e., the organic sulfur-containing compound, such as an organic sulfide (the sulfur-containing component of the combination of additives) may be present in amounts between about 0.025 to 1 or 2% by weight of the total composition. Effective results are usually obtained when the sulfur-containing component of the combination of additives is present between about 0.05 and between about 0.2% by weight of the total composition. Typical examples of the sulfur-containing component as set forth hereinbefore include such organic sulfides as the alkyl disulfides, the aryl disulfides, wax disulfide, sulfurized sperm oil, sulfurized olefin, especially the sulfurized wax olefins.

The combination of additives of the present invention is usually present in phosphorus-containing compositions in an amount between about 0.5 and about 6% by weight of the total composition. Mixtures of various epoxy and sulfur-containing organic compounds may be employed in the compositions of the invention.

Compositions possessing lubricating properties, especially hydraulic fluids, usually contain viscosity index-improving agents, such as a polyisobutene, polymerized organic silicones, polymerized styrene and vinyl compounds, such as an alkylated styrene polymer, etc. Typical isobutene and alkylated styrene polymers which may be used as a viscosity index improvre have the following physical properties:

|  | Polyiso-Butene—Sold commercially under the trade-name Paratone | Alkylated Styrene Polymer—Sold commercially under the trade-name Santodex |
| --- | --- | --- |
| Gravity, °A. P. I. | 29 | 25.9 |
| SUV at 100° F.[1] | 42,600 | 30,000 |
| SUV at 210° F.[1] | 3,000 | 1,900 |

[1] Saybolt Universal viscosity.

In general the above viscosity index improving agents have an average molecular weight of from about 5,000 to about 35,000. Viscosity index improving agents which may be used in the compositions of the subject invention, also include polymerized esters of the acrylic acid series, such as polymerized acrylic acid esters and more particularly polymerized methacrylic acid esters. The latter are readily available as commercial products, and are sold under the trade-name "Acryloid." The esters to be used should have molecular weights from about 5,000 to about 25,000 preferably 5,000 to 15,000. It is understood that this is an average figure for the mixtures of polymers which is usually present due to the greater or lessor degree of polymerization.

The acids should preferably be esterified with aliphatic alcohols having two to fifteen carbon atoms, and the polymers may be homopolymers of a single ester or may be copolymers of a mixture of such esters. The term "polymerized esters" will be understood to include both of these types.

The polymerized esters are generally available as concentrated dispersions in a solvent, such as a light mineral oil. The commercially available varieties usually conatin about equal amounts of the polymer and the solvent. Typical Acryloid viscosity index improving agents are Acryloid HF 855 and Acryloid HF 8125. Acryloid HF 855 is a solution of the polymerized esters in a petroleum base stock of a 200° F. flash point mineral oil and a 30% by weight solution has a viscosity of 55 centistokes (cs.) at 210° F. in a standard base stock having a viscosity of 3.3 cs. at 100° F. Acryloid HF 8125 is a solution of the polymerized ester in a petroleum base stock of a 300° F. flash point mineral oil and a 30% by weight solution has a viscosity of 125 cs. at 210° F. in a standard base stock having a viscosity of 3.3 cs. at 100° F.

The viscosity index improving agents may be present in effective minor amounts up to about 20–25% by weight of the total composition. Generally, these agents may be employed in an amount between about 2% to about 10% by weight, preferably between 5% and 10% by weight. However, lower or higher concentrations may, if necessary or desirable, be used.

While the above-indicated combination of additives has been found to be the most effective as corrosion and oxidation inhibitor, other corrosion inhibitors may in addition be present. Other inhibitors which may be present as well include hydroxyaromatic carboxylic acids, alkyl malonic acids, the polyvalent metal salts of hydrocarbon sulfonic acids, amines, amino phenols and the other substituted phenols.

The phosphorus-containing compositions of the subject invention may be modified by and include other suitable ingredients, preferably in minor amounts. Such optional ingredients include mineral oils, synthetic oils, and flame-proofing compounds.

Suitable synthetic lubricants which may be present in the phosphorus-containing compositions of the invention include especially the polymerized alkylene oxides or glycols, such as polymeric 1-2-propylene oxide and polymerized trimethylene oxide. Another type of synthetic lubricant which may be present includes esters of dicarboxylic acids such as the sebacates and adipates as well as other acids having four to twelve carbon atoms, said acids being esterified with alcohols having two to fifteen carbon atoms, such as di(2-ethylhexyl) sebacate.

Flame-proofing agents which may be present are exemplified by methylene iodide and may be present up to about 10% by weight of the composition, also chlorinated hydrocarbons.

The following examples illustrate the present invention.

EXAMPLE I

To demonstrate the remarkably reduced corrosivity and oxidation susceptibility of phosphorus-containing compositions wherein the combination of additives according to the present invention is present and in order to demonstrate the synergistic action of the components of the combination of additives according to the present invention, various phosphorus-containing compositions were subjected to the oxidation and corrosion test described in Army-Navy periodical specification for hydraulic oils, AN-O-366, June 1947. After one week at 121° C. as prescribed for the above-identified test the following results set forth in Table A below were obtained.

Table A

| No. | Composition—All percentages are percent by wt. | Corrosion—Weight loss, mg/cm² | | | | | Oxidation | |
|---|---|---|---|---|---|---|---|---|
| | | Cu | Mg | Fe | Cd | Al | Acid Neut. No. | Percent Increase in Visc. at 100° F. |
| 1 | 100% diphenyl octyl phosphate | 8.50 | 0.01 | 0.02 | 0.06 | 0.01 | 2.50 | |
| 2 | 99% diphenyl octyl phosphate / 1% glycidyl phenyl ether | 4.13 | 0.01 | 0.02 | 0.09 | 0.01 | 1.63 | |
| 3 | 99.75% diphenyl octyl phosphate / 0.25% wax disulfide | 0.63 | 0.01 | 0.04 | 0.03 | 0.02 | 2.31 | |
| 4 | 98.9% diphenyl octyl phosphate / 1% glycidyl phenyl ether / 0.1% wax disulfide | 0.40 | 0.01 | 0.02 | 0.02 | 0.02 | 1.14 | |
| 5 | 100% trioctyl phosphate | 7.91 | 7.02 | 0 | 3.17 | 0.02 | 37.1 | 56 |
| 6 | 98.6% trioctyl phosphate / 1.3% glycidyl phenyl ether / 0.1% wax disulfide | 0.28 | 0.01 | 0 | 0.05 | 0.01 | 0.25 | 2.5 |
| 7 | 84% trioctyl phosphate / 10% diphenyl cresyl phosphate / 5% Acryloid HF 855 / 1% glycidyl phenyl ether | 1.86 | 1.72 | +0.07 | 1.65 | +0.07 | 28.0 | 41 |
| 8 | 84% trioctyl phosphate / 10% diphenyl cresyl phosphate / 5% Acryloid HF 855 / 0.9% glycidyl phenyl ether / 0.1% wax disulfide | 0.28 | 0.01 | 0.01 | 0.02 | 0 | 0.26 | 4 |
| 9 | 83.5% trioctyl phosphate / 10% tricresyl phosphate / 5.5% Acryloid HF 855 / 1% glycidyl phenyl ether | 4.04 | 0.07 | 0 | 2.61 | 0.61 | 17.7 | 26 |
| 10 | 83.5% trioctyl phosphate / 10% tricresyl phosphate / 5.5% Acryloid HF 855 / 0.9% glycidyl phenyl ether / 0.1% wax disulfide | 1.04 | 0 | 0.01 | 0.03 | 0.01 | 0.33 | 5 |
| 11 | 100% bis(2-ethylhexyl) phenyl phosphine oxide | 45.3 | +0.08 | +0.08 | +0.08 | +0.08 | 19.7 | 50.5 |
| 12 | 94% bis(2-ethylhexyl) phenyl phosphine oxide / 5% Acryloid HF 8125 / 0.9% glycidyl phenyl ether / 0.1% wax disulfide | 1.88 | 0 | +0.08 | +0.20 | 0 | 0.63 | 6 |

The above data effectively demonstrate the superiority of organic phosphorus compositions containing the combination of additives of the invention relative to freedom from corrosive attack upon metal and oxidation susceptibility.

EXAMPLE II

In order to further demonstrate the superiority of phosphorus-containing compositions wherein is present the combination of additives of the present invention, further tests were performed. The tests employed are similar to the above-identified Army-Navy specification for hydraulic oils AN-O-366 except that the metal specimens were in the shape of washers and were mounted on a bubbler tube with glass spacers. The metal area, air flow, sample size were all reduced one-fifth from the above-indicated standard test and the test time reduced to 71 hours, about two-fifths of the standard test. The results obtained are set forth in Table B below.

The following table illustrates specific compositions of this invention, each component of which may be used in amounts indicated above.

Table B

| No. | Composition—All percentages are percent by wt. | Corrosion—Weight loss, mg/cm² | | | | | Oxidation | |
|---|---|---|---|---|---|---|---|---|
| | | Cu | Mg | Fe | Cd | Al | Acid Neut. No. | Percent Increase in Visc. at 100° F. |
| 13 | 100% trioctyl phosphate | 1.56 | 5.91 | 0.12 | 27.0 | 0.16 | 48.4 | 53 |
| 14 | 98.9% trioctyl phosphate<br>1% glycidyl o-cresyl ether<br>0.1% wax disulfide | 0.04 | +0.16 | +0.08 | +0.08 | +0.08 | 0.16 | 1 |
| 15 | 98.9% trioctyl phosphate<br>1% glycidyl o-cresyl ether<br>0.1% wax disulfide | +0.08 | +0.24 | +0.36 | +0.24 | +0.24 | 0.28 | 0 |
| 16 | 98.9% trioctyl phosphate<br>1% styrene oxide<br>0.1% wax disulfide | 1.4 | +0.32 | +0.32 | +0.32 | +0.32 | 1.1 | 4 |
| 17 | 98.9% trioctyl phosphate<br>1% styrene oxide<br>0.1% di-benzyl disulfide | 1.28 | +0.40 | +0.36 | +0.36 | +0.28 | 0.49 | 1.5 |
| 18 | 98.95% trioctyl phosphate<br>1% glycidyl phenyl ether<br>0.05% di-butyl disulfide | 19.3 | +0.40 | +0.40 | 5.52 | +0.40 | 6.5 | 10 |
| 19 | 98.9% trioctyl phosphate<br>1% glycidyl phenyl ether<br>0.1% di-Benzyl disulfide | 28.5 | +0.36 | +0.32 | +0.12 | +0.32 | 25.9 | 30 |
| 20 | 84% trioctyl phosphate<br>10% diphenyl cresyl phosphate<br>6% Acryloid HF 855 | 0.40 | 0.56 | 0.56 | 0.12 | 0.12 | 33.6 | 42.5 |
| 21 | 83% trioctyl phosphate<br>10% diphenyl cresyl phosphate<br>5.9% Acryloid HF 855<br>1% glycidyl phenyl ether<br>.1% wax disulfide | 0.36 | 0.08 | 0 | 0.12 | 0.08 | 0.31 | 0 |
| 22 | 83% trioctyl phosphate<br>9.8% diphenyl cresyl phosphate<br>6% Acryloid HF 855<br>1% glycidyl phenyl ether<br>0.2% P₂S₅ reaction product of pinene | 0.48 | 0.04 | 0.12 | 0.16 | 0 | 0.48 | 1.5 |
| 23 | 83% trioctyl phosphate<br>9.8% diphenyl cresyl phosphate<br>6% Acryloid HF 855<br>1% glycidyl phenyl ether<br>0.2% sulfurized sperm oil | 2.32 | 0.12 | 0.08 | 0.04 | 0 | 24.6 | 34 |
| 24 | 100% diphenyl ethyl phosphate | 3.36 | 2.56 | 0 | 0.16 | +0.08 | 1.5 | 4 |
| 25 | 98.9% diphenyl ethyl phosphate<br>1% glycidyl phenyl ether<br>0.1% wax disulfide | 0.68 | 0.40 | 0.36 | 0.36 | 0.40 | 1.2 | 2 |
| 26 | 98.9% diphenyl ethyl phosphate<br>1% glycidyl phenyl ether<br>0.1% butyl disulfide | 0.56 | +0.36 | +0.32 | +0.36 | +0.36 | 1.3 | 4 |
| 27 | 85% trioctyl phosphate<br>10% diphenyl cresyl phosphate<br>5% Acryloid HF 8125 | 3.68 | 4.16 | 0 | 0 | 0.04 | 33.5 | 45 |
| 28 | 84% trioctyl phosphate<br>10% diphenyl cresyl phosphate<br>5% Acryloid HF 8125<br>1% glycidyl phenyl ether | 4.04 | 1.36 | 0.12 | 0.12 | 0.12 | 36.1 | 47 |
| 29 | 84.7% trioctyl phosphate<br>10% diphenyl cresyl phosphate<br>5% Acryloid HF 8125<br>3% P₂S₅ reaction product with pinene | 3.4 | 0 | 0 | 0 | 0.04 | 0.79 | 1.3 |
| 30 | 84% trioctyl phosphate<br>9.9% diphenyl cresyl phosphate<br>5% Acryloid HF 8125<br>1% glycidyl phenyl ether<br>0.1% wax disulfide | 0.20 | 0 | 0 | 0 | 0 | 0.13 | 1.5 |
| 31 | 100% dioctyl phthalate | 4.44 | 0.08 | +0.04 | 12.8 | +0.08 | 47.8 | 111 |
| 32 | 98.9% dioctyl phthalate<br>1% glycidyl phenyl ether<br>0.1% wax disulfide | 0.76 | 0.28 | 0.32 | 0.92 | 0.28 | 27.2 | 50 |

| Components Present | Composition No. | | | | | | | | | | | | | | | | | | | | | | |
|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| Phosphorus-Containing Compound: | | | | | | | | | | | | | | | | | | | | | | | |
| tributyl phosphate | x | | | x | | x | | | | | | | x | | | x | | | x | | | x | |
| triamyl phosphate | | x | | | | | | | | | | | | | | | | | | | | | |
| tri-2-ethylhexyl phosphate | | | x | | | | | | | x | | | | | | | x | | | | | | |
| tri-n-octyl phosphate | | | | | x | | | | | | | | | | | | | | | | | | x |
| dibutyl octyl phosphate | | | x | | | x | | | | | | | | | | | | | | | | | |
| tri-n-hexyl phosphate | | | | | | | x | | | | | | | | | | | | | | x | | |
| tri-2-ethylbutyl phosphate | | | | | | | | x | | | | | | | | | | | | | | | |
| tris(3,5,5-trimethylhexyl) phosphate | | | | | | | | | x | | | | | | | | | x | | | | | |
| tricresyl phosphate | | | x | | | | | | | x | x | | | x | | | x | | | x | | x | |
| diphenyl octyl phosphate | | | | x | | x | x | | | x | | | | x | | x | | | | | | | x |
| diphenyl cresyl phosphate | | | | | | | | | | | | | | | | | | | | | | | |
| diphenyl-o-chloro phenyl phosphate | | | | | | | | | | | | | x | | | x | | | x | | | | |
| diphenyl ethyl phosphate | | | | | | | | | | | | x | | x | | | x | | x | | | | |

| Components Present | Composition No. | | | | | | | | | | | | | | | | | | | | | | |
|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| Phosphorus-Containing Compound—Continued | | | | | | | | | | | | | | | | | | | | | | | |
| tributyl phosphite | | | x | | | | | | | | | | | x | | | | | | | | | |
| dioctyl iso-octenyl phosphonate | | | | | | | | | | | | | | | x | | | | | | | | |
| dioctyl styryl phosphonate | | | | | | | | | | | | | | | | x | | | | | | | |
| tris-2-chloroethyl phosphate | | | | | | | | | | | | | | | | | x | | | | | | |
| tri-butoxyethyl phosphate | | | | | | | | | | | | | | | | | | x | | | | | |
| tri-butoxyoctyl phosphate | | | | | | | | | | | | | | | | | | | x | | | | |
| di-butyl n-octane phosphonate | | | | | | | | | | | | | | | | | | | | x | | | |
| tris (trimethyl cyclohexyl carbinyl) phosphate | | | | | | | | | | | | | | | | | | | | | x | | |
| phosphate of 3-hydroxy-propyl amyl sulfide | | | | | | | | | | | | | | | | | | | | | | x | |
| dimethyl tetradecane phosphonate | | | | | | | | | | | | | | | | | | | | | | | x |
| Viscosity Index Improving Agent: | | | | | | | | | | | | | | | | | | | | | | | |
| Polyisobutene | | | | x | | | x | | | | | | | | | | | | | x | | x | |
| Polymerized ester of the acrylic acid series | x | x | | | | | | | | | | | | | | | | | | x | x | | x |
| Alkylated styrene polymer | | | | x | | | | | | x | | | | | | | | | | | | | |
| Epoxy Compound: | | | | | | | | | | | | | | | | | | | | | | | |
| glycidyl phenyl ether | x | | | x | | | | x | | x | | x | | | | x | | | | x | | | |
| styrene oxide | | x | | | | | | | | | | x | | | | | x | | | | | | |
| glycidyl cyclohexyl ether | | | | x | | | | | | | | | | x | | | | | | | | | |
| glycidyl o-cresyl ether | | | | | | | | | | | | | | x | | | | | | | | | |
| glycidyl methyl ether | | | | | x | | | | | | | | | | | | x | | | | | | |
| glycidyl isopropyl ether | | | x | | | | | | | | | | | | x | | | | | | | | |
| isobutylene oxide | | | | | | | | | x | | | | | | | | | | | | | | |
| butadiene monoxide | | | | | | | | | | x | | | | | | | | | | | | x | |
| glycidyl ethyl ether | | | | | | x | | | | | | | | | | | | x | | | | | |
| Organic Sulfur-containing Compound: | | | | | | | | | | | | | | | | | | | | | | | |
| wax disulfide | x | | | x | | | | | | | x | x | | | | x | | | | | | | |
| sulfurized sperm oil | | x | | | | | | | | | | | | | | | x | | | | | | |
| P₂S₅ reaction product with pinene | | | | | | x | | | | | | | x | | | | | | | | | | |
| di-benzyl disulfide | | | | x | | | | | | | | | | x | | | x | | | | | | |
| di-butyl disulfide | | | | | | | | | x | | | | | | | | | x | | | | | |
| di-amyl disulfide | | | | | | | | x | | | | | | | | | | | | | | | |
| di-phenyl disulfide | | | | | | | | | x | | | | | | | | | | | x | | | |
| di-lauryl disulfide | | | | | | | x | | | | | x | | | | | | | | | | | x |
| di-octyl disulfide | | x | | | | | | | | | | | | | | x | | | | | | x | |

I claim as my invention:

1. A hydraulic fluid composition comprising a major proportion of a dialkylarylphosphine oxide, 0.25 to 5% by weight of the total composition of an epoxy compound and 0.025 to 1% by weight of the total composition of a sulfur-containing organic compound selected from the group consisting of aliphatic disulfides, aromatic disulfides, sulfurized sperm oils, and sulfurized terpenes.

2. A hydraulic fluid composition comprising a major proportion of a trialkyl phosphate, 0.25 to 5% by weight of the total composition of an epoxy compound and 0.025 to 1% by weight of the total composition of a sulfur-containing organic compound selected from the group consisting of aliphatic disulfides, aromatic disulfides, sulfurized sperm oils, and sulfurized terpenes.

3. A hydraulic fluid composition comprising a major proportion of triaryl phosphate, 0.25 to 5% by weight of the total composition of an epoxy compound and 0.025 to 1% by weight of the total composition of a sulfur-containing organic compound selected from the group consisting of aliphatic disulfides, aromatic disulfides, sulfurized sperm oils, and sulfurized terpenes.

4. A hydraulic fluid composition comprising a major proportion of a mixed alkyl aryl phosphate, 0.25 to 5% by weight of the total composition of an epoxy compound and 0.025 to 1% by weight of the total composition of a sulfur-containing organic compound selected from the group consisting of aliphatic disulfides, aromatic disulfides, sulfurized sperm oils, and sulfurized terpenes.

5. A hydraulic fluid composition comprising a major proportion of a mixture of trialkyl phosphate and a triaryl phosphate 0.25 to 5% by weight of the total composition of an epoxy compound and 0.025 to 1% by weight of the total composition of a sulfur-containing organic compound selected from the group consisting of aliphatic disulfides, aromatic disulfides, sulfurized sperm oils, and sulfurized terpenes.

6. A hydraulic fluid composition comprising a major proportion of diphenyl octyl phosphate, 0.25 to 5% by weight of an epoxy compound and 0.025 to 1% by weight of the total composition of an oil-soluble sulfur-containing organic compound selected from the group consisting of aliphatic disulfides, aromatic disulfides, sulfurized sperm oils, and sulfurized terpenes.

7. A hydraulic fluid composition comprising a major proportion of a mixture of a trioctyl phosphate and diphenyl cresyl phosphate, 0.25 to 5% by weight of the total composition of an epoxy compound and 0.025 to 1% by weight of the total composition of a sulfur-containing organic compound selected from the group consisting of aliphatic disulfides, aromatic disulfides, sulfurized sperm oils, and sulfurized terpenes.

8. A hydraulic fluid composition comprising 50 to 95% by weight of the total composition of diphenyl octyl phosphate, 0.25 to 5% by weight of the total composition of glycidyl phenyl ether and 0.05 to 0.2% by weight of the total composition of wax disulfide.

9. A hydraulic fluid composition comprising a major proportion of an ester of an acid of phosphorus, 0.25 to 5% by weight of the total composition of an epoxy compound and 0.025 to 1% by weight of the total composition of a sulfur-containing organic compound.

10. A composition comprising a major proportion of a trialkyl phosphate, 0.25 to 5% by weight of the total composition of an aryl epoxy compound and 0.025 to 1% by weight of the total composition of an aliphatic disulfide.

11. A composition comprising a major proportion of a triaryl phosphate, 0.25 to 5% by weight of the total composition of a glycidyl ether and 0.025 to 1% by weight of the total composition of an aromatic disulfide.

12. A fluid composition comprising a major proportion of a diaryl alkyl phosphate, 0.25 to 5% by weight of the total composition of a glycidyl ether containing one carbocylic group directly attached to the ether oxygen atom and 0.025 to 1% by weight of the total composition of a wax disulfide.

13. A fluid composition comprising a major proportion of a dialkyl aryl phosphine oxide, 0.25 to 5% by weight of the total composition of a glycidyl ether and 0.025 to 1% by weight of the total composition of a wax disulfide.

14. A composition comprising a major proportion of a phosphorus compound of the group consisting of an ester of an acid of phosphorus and trihydrocarbyl phosphine oxides, 0.25 to 5% by weight of the total composition of an epoxy compound and 0.025 to 1% by weight of the total composition of a sulfur-containing organic compound of the group consisting of aliphatic disulfides, aromatic disulfides, sulfurized sperm oils, and sulfurized terpenes.

15. A hydraulic fluid composition comprising a major proportion of diphenyl octyl phosphate, 0.25% to 5% by weight of a glycidyl ether and 0.025% to 1% by weight of wax disulfide.

16. A hydraulic fluid composition comprising a major proportion of a mixture of a trioctyl phosphate and diphenyl cresyl phosphate, 0.25% to 5% by weight of the total composition of an epoxy compound and 0.025% to 1% by weight of the total composition of the wax disulfide.

17. A composition comprising a major proportion of an ester of an acid of phorphorus, 0.25-5% by weight of the total composition of an epoxy compound and 0.025-1% by weight of the total composition of a sulfur-containing organic compound.

18. A composition comprising a major proportion of an ester of a phosphorus acid and 0.25-5% by weight of glycidyl phenyl ether and 0.025-1% by weight of the total composition of an aliphatic disulfide.

19. A composition comprising a major proportion of an ester of a phosphorus acid and 0.25-5% by weight of glycidyl phenyl ether and 0.025-1% by weight of the total composition of a wax disulfide.

20. A composition comprising a major proportion of an ester of a phosphorus acid and 0.25-5% by weight of a glycidyl ether and 0.025-1% by weight of the total composition of a wax disulfide.

FORREST J. WATSON.

References Cited in the file of this patent

UNITED STATES PATENTS

| Number | Name | Date |
|---|---|---|
| 2,404,871 | Vann Ess et al. | July 30, 1946 |
| 2,410,608 | Morgan | Nov. 5, 1946 |
| 2,442,741 | Morgan | June 1, 1948 |
| 2,509,620 | Watson et al. | May 30, 1950 |
| 2,531,829 | Seymour | Nov. 28, 1950 |
| 2,549,270 | Watson | Apr. 17, 1951 |